US007715722B1

(12) United States Patent
Hoke et al.

(10) Patent No.: US 7,715,722 B1
(45) Date of Patent: May 11, 2010

(54) FIBER OPTIC RADIO FREQUENCY DISTRIBUTION SYSTEM

(75) Inventors: Terry L. Hoke, Farmington, MN (US); Joseph Pobiel, Eden Prarie, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1024 days.

(21) Appl. No.: 11/340,936

(22) Filed: Jan. 27, 2006

(51) Int. Cl.
H04B 10/00 (2006.01)
H04B 1/38 (2006.01)

(52) U.S. Cl. ............... 398/115; 398/116; 398/45; 398/58; 398/66; 455/561; 455/562.1; 455/39

(58) Field of Classification Search ........... 398/19, 398/28, 33, 45, 115, 116, 58, 66; 455/3, 455/39, 73, 562, 561, 562.1
See application file for complete search history.

(56) References Cited

U.S. PATENT DOCUMENTS

| | | | | |
|---|---|---|---|---|
| 5,051,754 | A * | 9/1991 | Newberg | 342/375 |
| 5,661,582 | A * | 8/1997 | Kintis et al. | 398/121 |
| 5,712,641 | A * | 1/1998 | Casabona et al. | 342/362 |
| 6,308,085 | B1 * | 10/2001 | Shoki | 455/562.1 |
| 2001/0046348 | A1 * | 11/2001 | Sarkimukka et al. | 385/24 |
| 2003/0002120 | A1 * | 1/2003 | Choa | 359/182 |
| 2003/0199266 | A1 * | 10/2003 | Zavidniak | 455/410 |
| 2003/0199286 | A1 * | 10/2003 | D du Toit | 455/550.1 |
| 2006/0115266 | A1 * | 6/2006 | Levi et al. | 398/19 |
| 2006/0172775 | A1 * | 8/2006 | Conyers et al. | 455/561 |
| 2007/0147290 | A1 * | 6/2007 | Dispensa et al. | 370/329 |
| 2007/0286599 | A1 * | 12/2007 | Sauer et al. | 398/28 |

OTHER PUBLICATIONS

Pappert et al: "Microwave fiber optic links for shipboard antenna applications", 2000 IEEE International Conference on Phased Array Systems and Technology, May 21-25, 2000, pp. 345-348.*

* cited by examiner

*Primary Examiner*—Li Liu
(74) *Attorney, Agent, or Firm*—Hamre, Schumann, Mueller & Larson, P.C.

(57) ABSTRACT

A scalable, flexible, automated radio frequency distribution system (FORFDS) employs fiber optics to eliminate the need for metallic/coaxial type interconnections between onboard and fixed-site radios and antennas. Key elements of the FORFDS may include, for example, 1) electrical to optical conversion (and vice versa) of RF signals, 2) optical switching, 3) automated control and monitoring, including Ethernet interfaces, and 4) high density packaging. The system is compatible with JTRS (2 MHz to 2000 MHz), is scalable and cost effective (no longer in the laboratory or concept high cost ranges), compared with known technologies.

9 Claims, 6 Drawing Sheets

FIBER OPTIC RADIO FREQUENCY DISTRIBUTION SYSTEM

BACKGROUND OF THE INVENTION

1. Field of the Invention

This invention relates generally to the field of shipboard communication systems. More particularly, the invention relates to a scalable, flexible, automated fiber optic radio frequency distribution system (FORFDS) that eliminates the need for metallic/coaxial type interconnections between radios and antennas employed onboard ships and at fixed-site installations.

2. Description of the Prior Art

Modern shipboard communication technology typically employs metallic/coaxial cabling to interconnect onboard radios with onboard antennas. Generally, such interconnections use a one-for-one connection scheme or alternatively, a stovepiped connection scheme. Although, a need still exists for conventional radio/antenna connection schemes, such connection schemes are disadvantageous in that they do not allow for flexibility of the onboard radio frequency (RF) systems. In fact, the one-for-one, or stovepiped connection schemes are becoming more problematic as communication systems migrate toward a Network Centric architecture [including Joint Tactical Radio System (JTRS)/Digital Modular Radio (DMR) radio systems]. A need therefore exists for an RF communication system architecture that is capable of connecting any onboard radio to any onboard antenna while simultaneously eliminating the need for metallic or coaxial type interconnections.

In view of the foregoing, it would be advantageous to provide an RF communication system that networks radios and antennas in such a way that the resultant communication distribution network is modular, scalable, flexible and automated such that the communication system is automatically adaptable to changing communication needs, e.g. migrating from an analog communication system to a digital communication system without manual alterations to the distribution network.

SUMMARY OF THE INVENTION

The present invention is directed to a scalable, flexible, automated radio frequency distribution system (FORFDS) using fiber optics to eliminate the need for metallic/coaxial type interconnections between onboard radios and antennas. Key elements of a FORFDS may include, for example, 1) electrical to optical conversion (and vice versa) of RF signals; 2) optical switching; 3) automated control and monitoring, including Ethernet interfaces; and 4) high density packaging. The system most preferably is compatible with JTRS (2 MHz to 2000 MHz), is scalable and cost effective (no longer in the laboratory or concept high cost ranges), compared with known technologies.

According to one embodiment, a fiber optic RF distribution system (FORFDS) suitable for both shipboard and fixed site applications, includes a fiber optic feed distribution between a communications center and antenna systems, fiber optic based switching for flexible communications, and software automation and control. The FORFDS provides a scalable interconnect capability for RF signals with the ability to distribute RF signals between radio channels and the antenna interconnect system. The FORFDS architecture provides a high bandwidth infrastructure of RF and digital data connectivity to between shipboard spaces to support current and future JTRS interface requirements. Further, distribution of fiber optic cabling at multiple points within a ship, such as provided by the Integrated Communications and Network (ICAN) blown-fiber system, the JTRS can be distributed within multiple spaces on a ship, thus improving survivability against catastrophic events, among other things.

The architecture associated with the fiber optic RF distribution system includes photonic switching by using mechanical and/or Wave Division Multiplex (WDM) implementation. The location of the switching components are dependant on the installation requirements, and may include switching co-located with the JTR set and/or co-located with the RF antenna interface components. The location of the switching system with the JTR set supports concentration of the fiber signals from remote locations. Conversely, location of the switching system near the antenna components supports distribution to remote antenna locations. The system includes high speed networking for real-time control and automation requirements. This implementation permits transfer of real-time radio and control information (frequency, power, etc.) as required in frequency agile waveforms. This network is also the means by which the Control and Management System (C&M) implements control, monitoring, and automation. Multiple and redundant fiber cabling harnessing can be employed to improve system availability and survivability.

Accordingly, one feature of the invention is directed to providing a fiber optic RF distribution system to improve ship cabling and provide a scalable infrastructure for future growth and technology insertion.

Another feature of the invention is directed to providing a fiber optic RF distribution system that substantially reduces hull and topside ship weight of cabling on a surface platform.

Yet another feature of the invention is directed to providing a fiber optic RF distribution system that exceeds the flexibility, scalability and automation capabilities of known shipboard RF distribution systems.

A joint tactical radio system (JTRS), as used herein, means a radio system that displaces known single function Legacy type radios by using software to implement various RF waveforms, including wideband networking waveforms (WNW). JTRS technology then drives the RF distribution system requirements.

One embodiment of a fiber optic RF distribution system (FORFDS), more specifically comprises a plurality of fiber optic cables, a radio system, an antenna system, a plurality of electrical to optical converters coupled to the radio system and configured to convert analog signals to optical signals, a plurality of electrical to optical converters coupled to the antenna system and configured to convert analog signals to optical signals, a plurality of optical to electrical converters coupled to the radio system and configured to convert optical signals to analog signals, a plurality of optical to electrical converters coupled to the antenna system and configured to convert optical signals to analog signals, at least one optical switch configured to selectively interface the optical signals with optical to electrical converters selected from the plurality of optical to electrical converters coupled to the radio system and the antenna system, and further configured to interface the analog signals with electrical to optical converters selected from the plurality of electrical to optical converters coupled to the radio system and the antenna system, such that low level analog signals can be transferred accurately between the radio system and the antenna system via at least one fiber optic cable selected from the plurality of fiber optic cables.

Another embodiment of a fiber optic RF distribution system (FORFDS), in accordance with the principles of the invention, comprises at least one radio system coupled via a plurality of electrical-to-optical and optical-to-electrical converters and at least one fiber optic cable to at least one antenna system remote from the radio system, and means for controlling selection of the plurality of converters, such that a low level analog signal can be transferred accurately between the at least one radio system and the at least one antenna system via the at least one fiber optic cable.

Yet another embodiment of a fiber optic RF distribution system, in accordance with the principles of the invention, comprises providing a fiber optic RF distribution system coupling a radio system with an antenna system that is remote from the radio system to create a network centric architecture, and transferring low level analog signals accurately between the radio system and the antenna system via the fiber optic RF distribution system.

BRIEF DESCRIPTION OF THE DRAWINGS

Other aspects and features of the present invention and many of the attendant advantages of the present invention will be readily appreciated as the same becomes better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The one-for-one, or stovepiped connection schemes employed in RF distribution systems associated with shipboard and fixed-site applications are becoming more problematic as communication systems migrate toward a Network Centric architecture [including Joint Tactical Radio System (JTRS)/digital mode radio (DMR) radio systems]. A need therefore exists, as stated herein before, for an RF communication system architecture that is capable of connecting any onboard radio to any onboard antenna while simultaneously eliminating the need for metallic or coaxial type interconnections. The communication system architecture most preferably is also scalable, flexible and automated, such that it can accommodate known communication technologies such as single function Legacy radios, while also being easily adaptable to meet the changing needs required by Network Centric operations, such as, for example, wideband networking waveforms (WNW).

Figure 1:
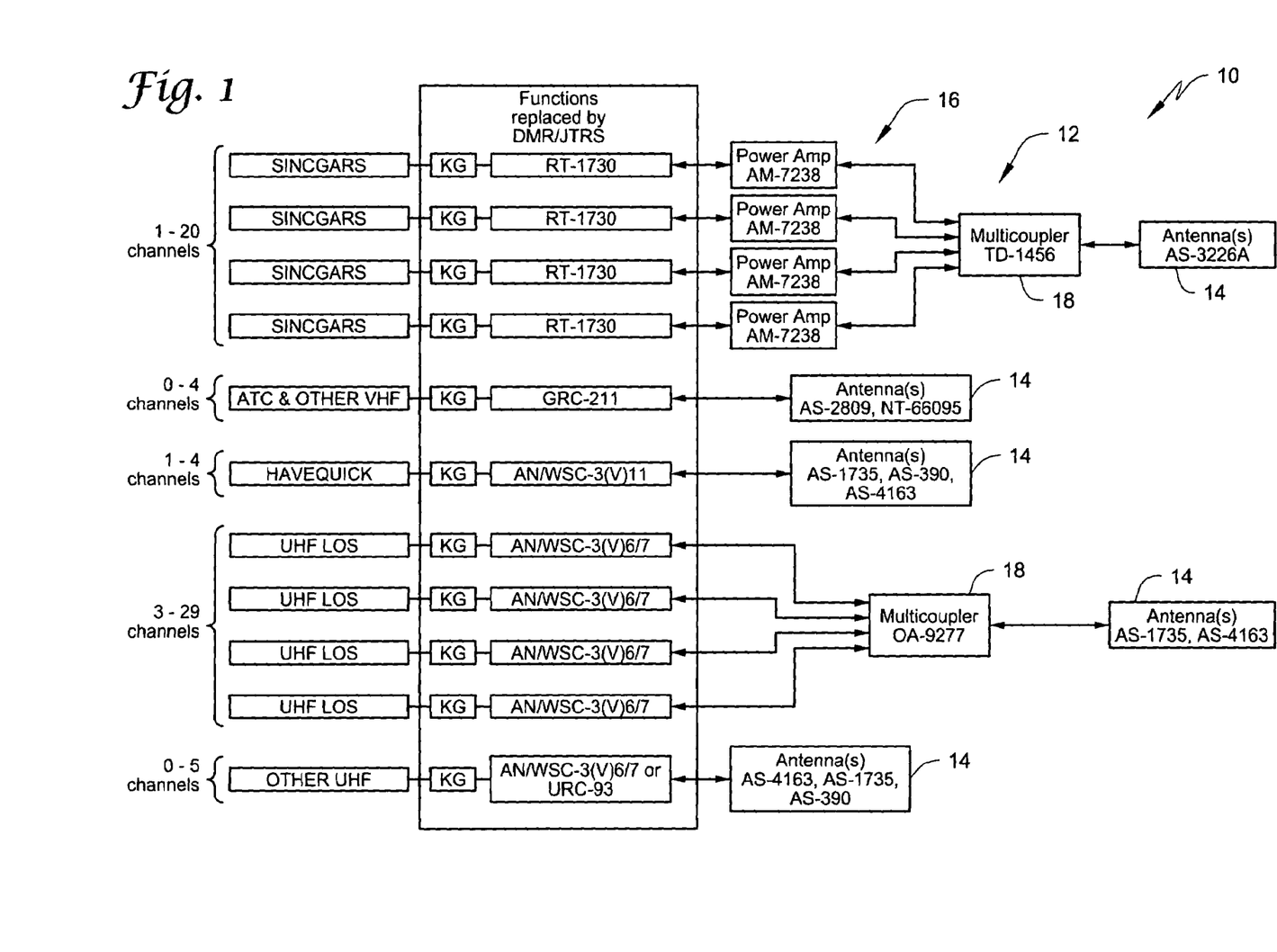
FIG. 1 is a block system diagram illustrating an existing shipboard RF distribution system.

In view of the foregoing, FIG. 1 depicts a block system diagram illustrating an existing shipboard RF distribution system 10 that employs a conventional stovepiped RF distribution architecture. System 10 is not scalable, flexible, or automated to easily meet the changing needs required by, for example, Network Centric Architectures, since system 10 is a hardwired system that employs metallic and/or coaxial type interconnections throughout the RF distribution system 10. Each RF communication channel 12 can be seen to be hardwired directly to a dedicated antenna 14, either directly, or via a power amplifier 16 and/or a coupler device 18. The distribution architecture associated with system 10 is mechanically cumbersome since each antenna must be hardwired into a communication channel either directly or via some type of switching mechanism. Either way, increased flexibility of such systems comes at the added expense of increased weight.

Figure 2:
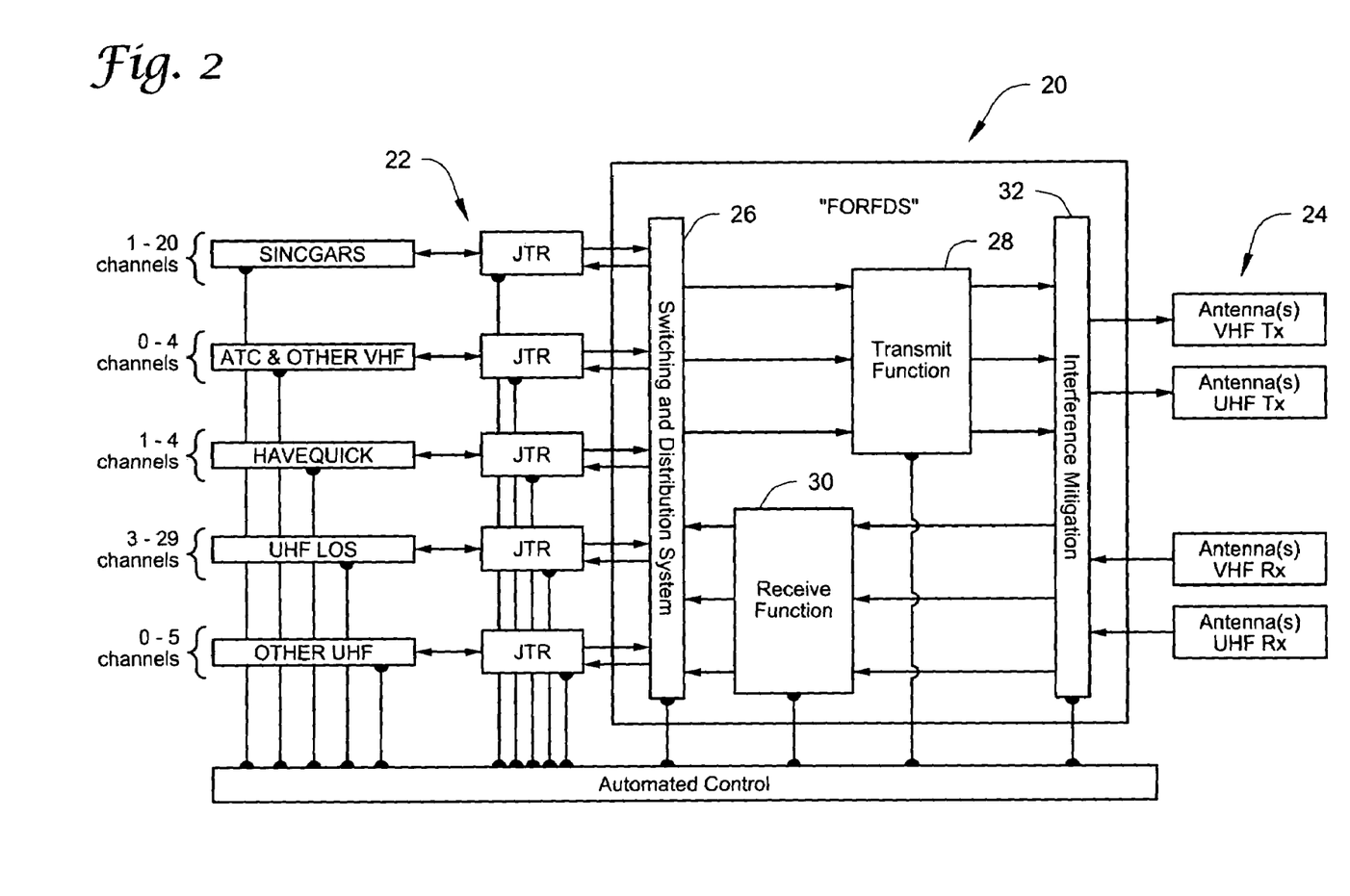
FIG. 2 is a simplified block system diagram illustrating a flexible, automated, scalable fiber optic RF distribution system that couples JTR technology to various antennas.

FIG. 2 is a simplified block system diagram illustrating a flexible, automated, scalable fiber optic RF distribution system 20 that couples JTR technology 22 to various types of antennas 24. The FORFDS 20 can be seen to include a switching and distribution system 26, a transmit function 28, a receive function 30, and interference mitigation technology 32. The switching and distribution system 26, transmit function 28, receive function 30, and interference mitigation technology 32 are suitable to implement a fiber optic RF distribution system that is flexible, scalable and automated, and that is therefore capable of meeting the changing requirements of a Network Centric Architecture such as JTRS radio systems.

Figure 3:
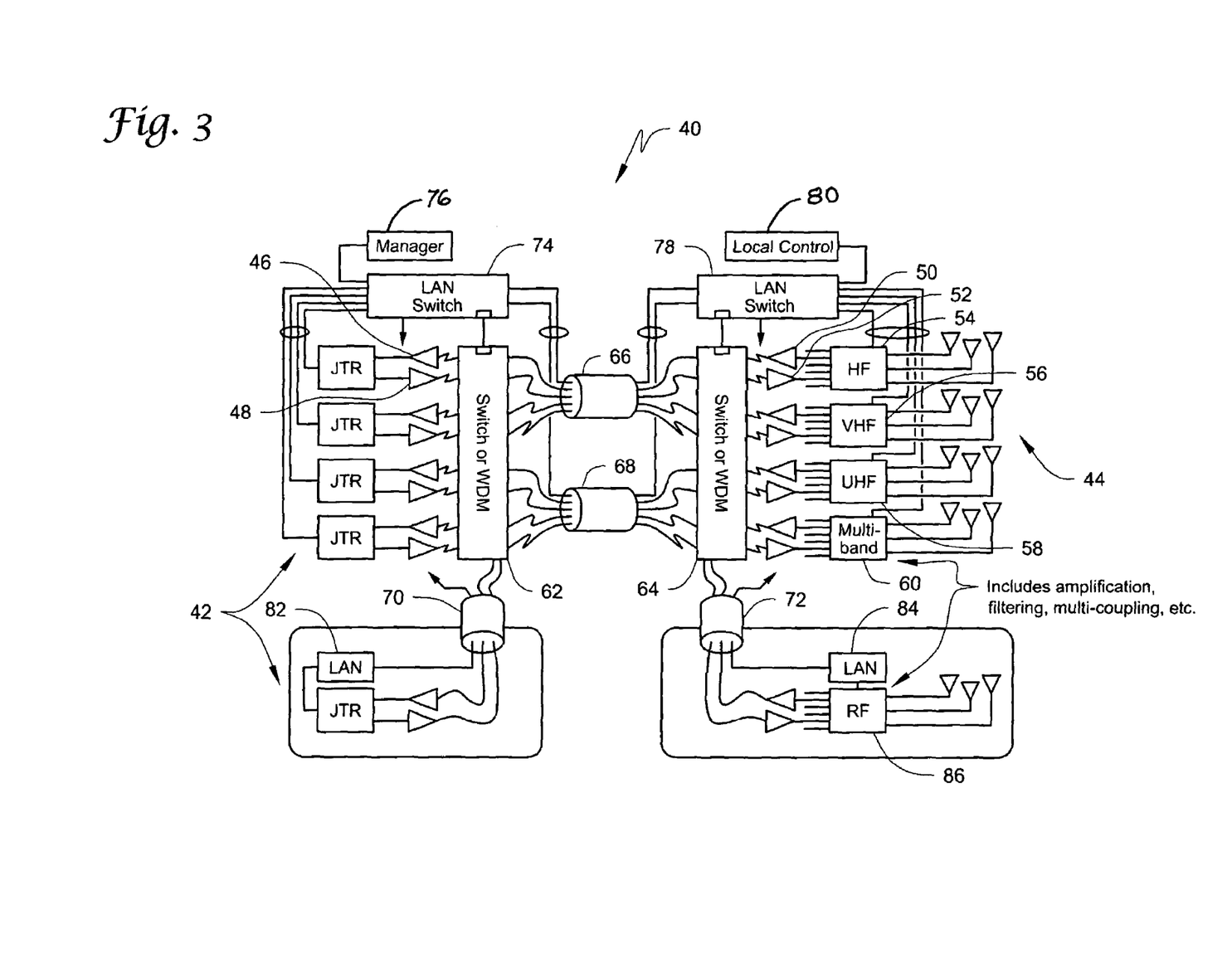
FIG. 3 is a more detailed block diagram illustrating a high level functional architecture of a fiber optic RF distribution system according to one embodiment of the present invention.

FIG. 3 is a more detailed block diagram illustrating a high level functional architecture of a fiber optic RF distribution system (FORFDS) 40 according to one embodiment of the present invention. The FORFDS 40 can be seen to optically couple a plurality of joint tactical radios (JTR)s 42 to a plurality of antennas 44.

A set of optical-electrical converters 46, 48 is associated with each JTR 42; while another set of optical-electrical converters 50, 52 are associated with a respective antenna interface hardware module 54, 56, 58, 60.

A first switching system 62 is included on the radio side of the system 40, while a second switching system 64 is included on the antenna side of the system 40. Each switching system 62, 64 may employ, for example, space division switching technology or wave division multiplexing (WDM) technology. Space division switching is most preferable since it provides highly desired low-loss, flexible, high-speed switching technology benefits not as easily attainable using WDM technology since the signals to be transmitted from the JTRs 42, through the fiber optic distribution system, and out the antennas 44, are analog in nature. An optical switch incorporating an optical switch matrix implemented via piezoelectric 3D beam steering technology developed by Polatis PLC was found suitable to provide a workable switch 62, 64.

A fiber optic distribution system that allows the desired flexibility, scalability and automation features to be achieved, importantly requires an architecture that is capable of accommodating such features. The architecture importantly must provide for maximizing signal quality to a level sufficient to provide a working fiber optic RF distribution system. Wave Division Multiplexing, for example, was found by the present inventors to be insufficient to achieve the desired results, since the insertion loss of WDM increases as the number of circuits increases and WDM is directed more towards digital signals and less toward analog signals. WDM therefore may be employed as the technology migrates from analog to digital signal transmission. The Noise Figure (NF) is required to be very low, while the Spurious Free Dynamic Range (SFDR) must be as high as possible to provide a workable FORFDS architecture. Those skilled in the analog signal art will appreciate that as the bandwidth increases, the SFDR will decrease. The present inventors, realizing that certain types of analog signals have a relatively narrow-band, recognized therefore, that limiting the bandwidth to only that required for the type of analog signals to be processed, would allow the SFDR to be increased to a level sufficient to achieve the desired system architecture.

Multi-cabling 66, 68, 70, 72 is employed to ensure survivability against, for example, certain catastrophic events. Optical-electrical converters 50, 52 operate to convert optical signals to electrical signals suitable for RF transmission via one or more selected antennas 44.

Signals received via antennas 44 are first converted into optical signals via optical-electrical converters 50, 52 suitable to transmission back to a respective JTR 42. The signals to and from each JTR 42 and each antenna 44 are transmitted over a selected fiber optic cable 66, 68, 70, 72.

A first local area network (LAN) switch 74 under the control of a network manager 76 operates to control selection of a JTR 42 associated with a first shipboard or fixed-site location. A second LAN switch 78 under a local control station 80 operates to control selection of a respective antenna interface hardware module 54, 56, 58, 60. A third LAN switch 82 operates to control selection of a JTR 42 that is unique to a first remote space on the ship or at a fixed-site location. A fourth LAN switch 84 operates to control selection of an antenna interface hardware RF module 86 that is unique to a second remote space on the ship or at a fixed-site location.

Each antenna interface hardware module 54, 56, 58, 60, 86 can be seen to employ amplification, filtering and multi-coupling, among other things, associated with different waveform technologies, including high frequency (HF), very high frequency (VHF), ultra high frequency (UHF), multiband and radio frequency (RF). Adjunct filtering was found to be very important to successful operation of the FORFDS 40. Numerous known adjunct filtering and signal conditioning techniques and technologies may be employed by one skilled in the analog filtering arts to achieve desired filtering characteristics; and so details associated with signal filtering will not be discussed herein to preserve brevity and to enhance clarity regarding the discussion of embodiments described herein. Any number of filtering and signal conditioning scheme(s) may be employed so long as the adjunct filtering narrows the bandwidth sufficiently as described herein before regarding the NF and SFDR.

The present invention is not so limited however, and those skilled in the art will readily appreciated that the foregoing waveform technologies are only exemplary of numerous waveforms that may be processed via the FORFDS 40.

In view of the foregoing, it is apparent that RF distribution is key to JTRS flexibility. It is also apparent that use of fiber optics allows the implementation of a scalable, flexible, automated RF distribution system.

The use of fiber optics to implement an RF distribution system for shipboard applications was found by the present inventors to provide significant weight savings over metallic and/or coaxial cable applications, by up to approximately 80%. The use of fiber optic technology advantageously also was found to allow flexibility when placing components onboard a ship, and was further found to support multifunctional and phase-array antenna architectures, features herein before not practically attainable using conventional metallic/coaxial cable technologies.

Figures 4A, 4B:
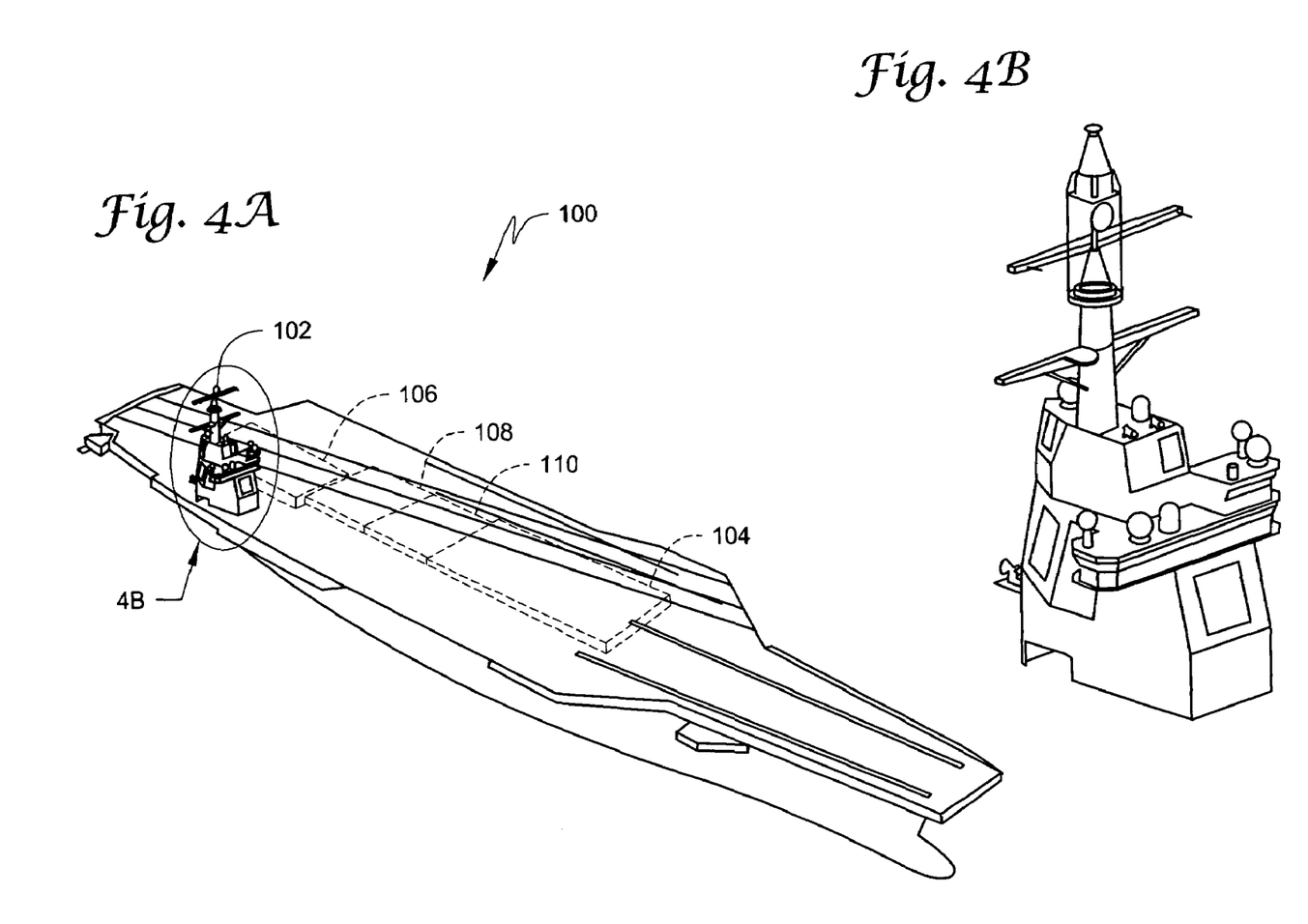
FIGS. 4A and 4B illustrate the fiber optic RF distribution system depicted in FIG. 3 deployed as a distributed system throughout a ship via fiber optic cabling.

FIGS. 4A and 4B illustrate one application of the fiber optic RF distribution system depicted in FIG. 3 deployed as a distributed system throughout a ship 100 via fiber optic cabling. The antennas along with the local control system may be located in the vicinity of the island house 102, or may, for example, be located below deck or at multiple antenna locations within the ship. The antennas may then, for example, be in fiber optic communication with radio equipment located in a communication center 104 or in multiple spaces 106, 108, 110 within the ship 100. Distribution of the antennas throughout the ship 100 then increases survivability of the communication system against certain catastrophic events.

The network manager 76, discussed herein before, then can utilize its full capabilities to automatically control the entire distributed fiber optic communication system in ways previously not achievable using known communication system distribution technology. The network manager 76, for example, can selectively control the function of each JTR and select an appropriate antenna at a desired location within the ship to transmit and receive desired analog signals. In this manner, a particular JTR 42 may operate as a high frequency radio in one instance and may, for example, operate as an ultra high frequency device in a different instance.

Figure 5A:
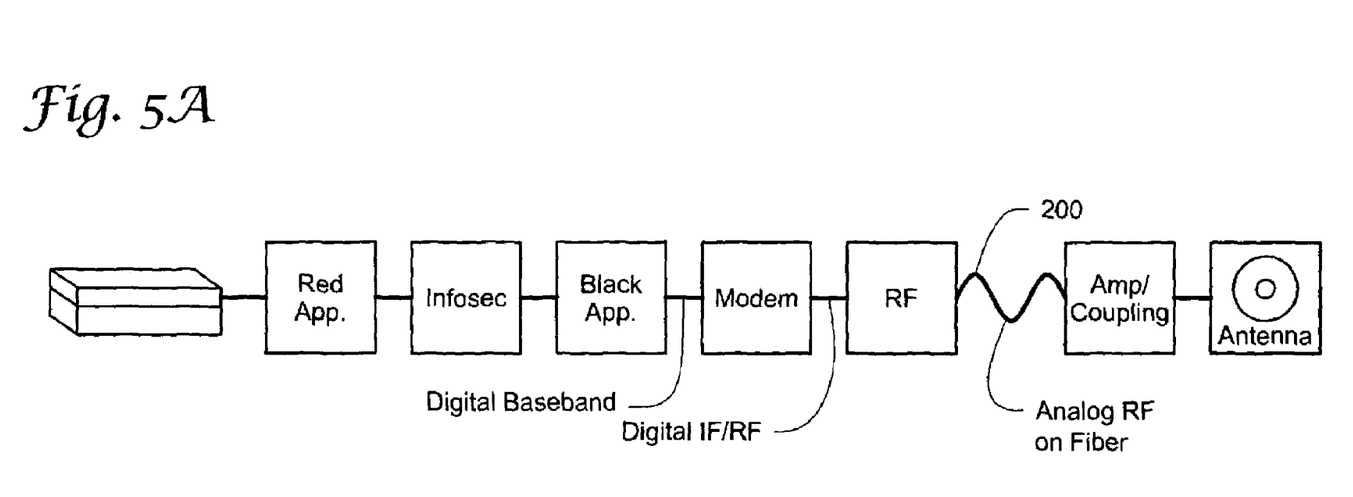
FIGS. 5(a) and 5(b) illustrate a transition from a single Legacy type radio system to a digital RF software driven radio system using the FORFDS shown in FIG. 3.
Figure 5B:
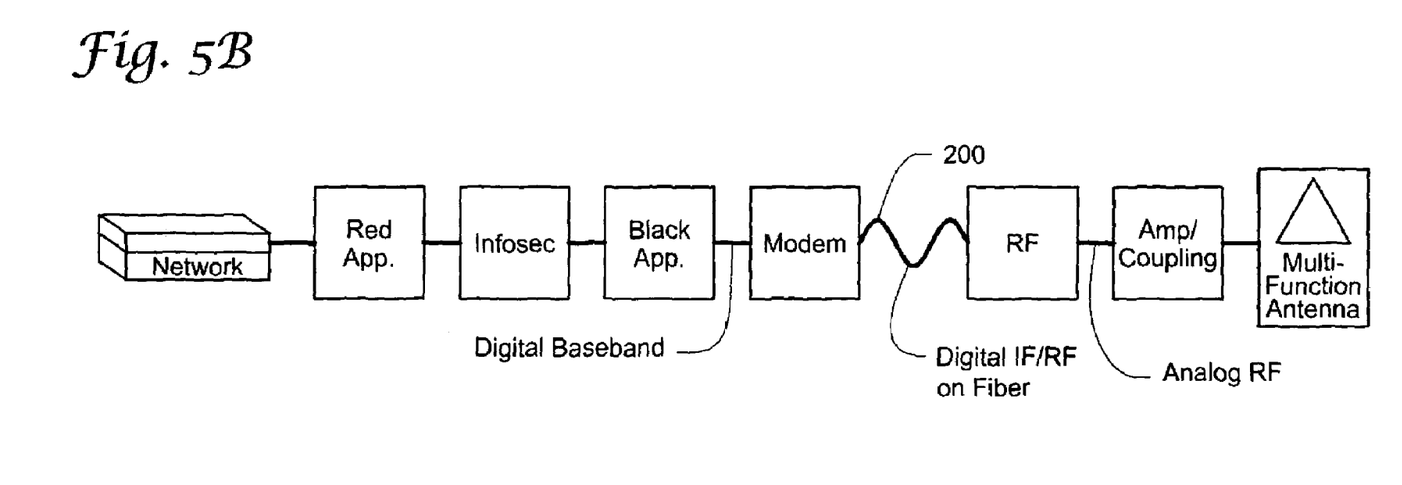

In summary explanation, simple low-loss switching technology is employed to implement a flexible, scalable, automated fiber optic RF distribution system. FIGS. 5(a) and 5(b) exemplify the flexibility of the FORFDS 40 by illustrating a transition from a single Legacy type radio system to a digital RF software driven radio system using the FORFDS shown in FIG. 3. In FIG. 5(a), an analog RF signal is distributed via analog RF on fiber 200; while in FIG. 5(b), a digital IF/RF signal is distributed via digital IF/RF on fiber 200.

Figure 6:
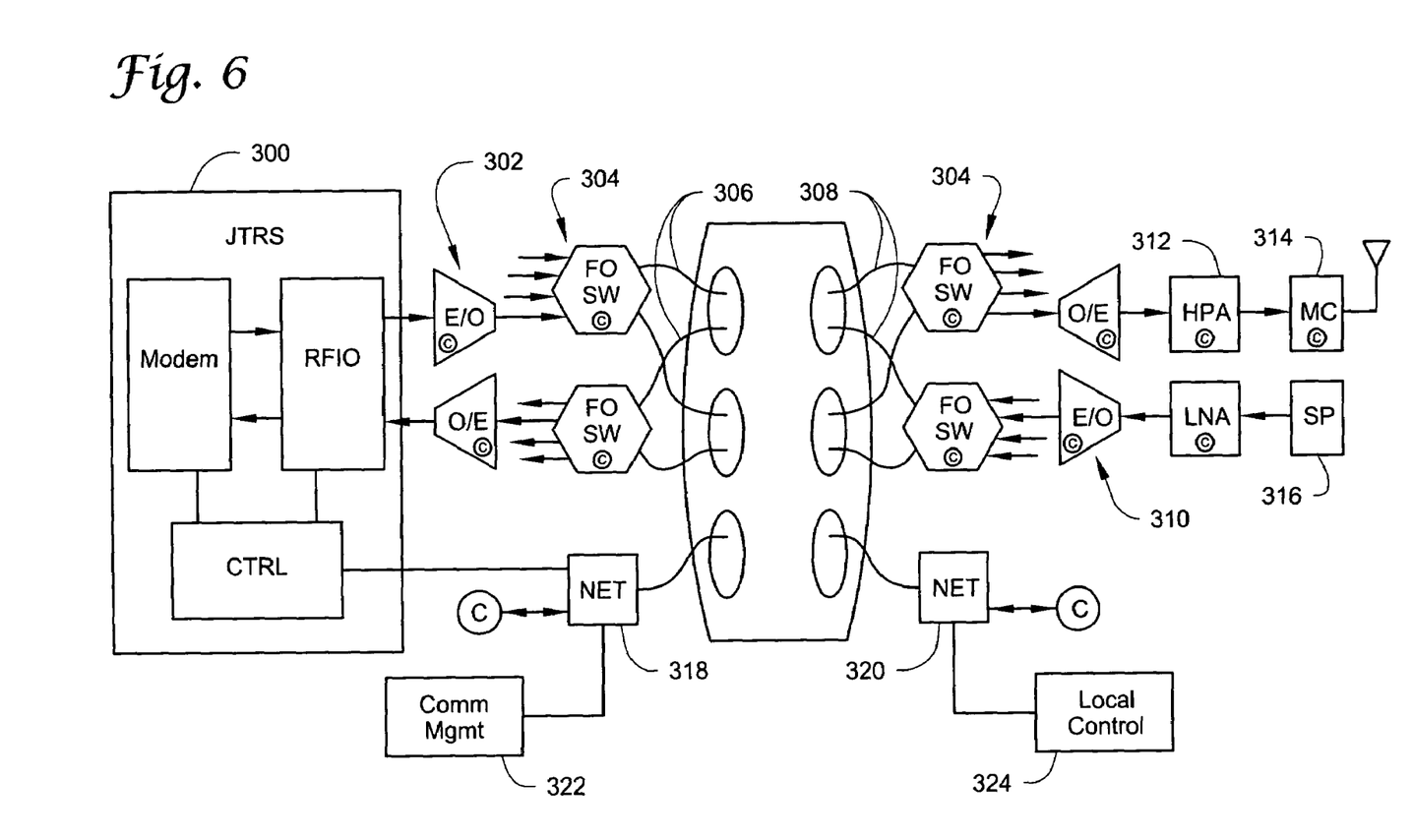
FIG. 6 is a high level functional diagram relating to the fiber optic RF distribution system shown in FIG. 3.

FIG. 6 is a high level functional diagram illustrating transmission of RF signals over fiber using the FORFDS principles described herein before. A joint tactical radio system (JTRS) 300 transmits/receives a 2 MHz to 2 GHz low level (<0 dBm) RF signal. Electrical-optical conversion 302 is performed onto or from a single mode fiber at the JTRS end of the system. Fiber optic switching 304 takes place on one or both ends (application dependent) to control the path between a particular JTR and a particular antenna. Multiple feed distribution paths 306, 308 operate to provide fiber optic path redundancy for survivability. Electrical-optical conversion 310 is also performed at the antenna end of the system. Amplification 312, as necessary, is provided to control transmit and receive signal levels. The fiber optic distribution system also includes multi-coupling 314, splitting 316 and antenna feed operations. High speed local area networks (LAN)s 318, 320 provide real-time control and monitoring capabilities. Local and remote control and management functions 322, 324 control and manage the features desired for a particular application.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A fiber optic RF distribution system (FORFDS), comprising:

a plurality of fiber optic cables;
a radio system;
an antenna system;
a plurality of electrical to optical converters coupled to the radio system and configured to convert analog signals to optical signals;
a plurality of electrical to optical converters coupled to the antenna system and configured to convert analog signals to optical signals;
a plurality of optical to electrical converters coupled to the radio system and configured to convert optical signals to analog signals;
a plurality of optical to electrical converters coupled to the antenna system and configured to convert optical signals to analog signals;
at least one optical switch co-located with the antenna system and configured to selectively interface the optical signals with optical to electrical converters selected from the plurality of optical to electrical converters coupled to the radio system and the antenna system, and further configured to interface the analog signals with electrical to optical converters selected from the plurality of electrical to optical converters coupled to the radio system and the antenna system, such that low level analog signals can be transferred accurately between the radio system and the antenna system via at least one fiber optic cable selected from the plurality of fiber optic cables in response to a control signal;
automated control and monitoring systems configured to monitor operation of the at least one optical switch and to generate the control signal, such that the at least one optical switch selectively passes an analog signal between a desired portion of the radio system and a desired antenna via at least one fiber optic cable selected from the plurality of fiber optic cables;
at least one system module that is configured to provide signal filtering and conditioning such that analog signals can pass accurately between the radio system and the antenna system; and
a second optical switch co-located with the radio system;
wherein the automated control and monitoring systems comprise at least a network manager system associated with the radio system and at least a local control system associated with the antenna system.

2. The FORFDS according to claim 1, wherein the optical switch is configured as a photonic matrix switch.

3. The FORFDS according to claim 1, wherein the radio system comprises at least one radio selected from the group consisting of a joint tactical radio, and a digital mode radio.

4. The FORFDS according to claim 1, wherein the at least one system module is selected from the group comprising a high frequency module, a very high frequency module, a ultrahigh frequency module, a multiband module, and a RF module, and
wherein the at least one system module provides signal filtering and conditioning in order to achieve a desired Noise Figure (NF) and a desired Spurious Free Dynamic Range (SFDR) between the radio system and the antenna system.

5. A fiber optic RF distribution system (FORFDS), comprising:
at least one radio system coupled via a plurality of electrical-to-optical and optical-to-electrical converters and at least one fiber optic cable to at least one antenna system remote from the radio system;
means for controlling selection of the plurality of converters, such that a low level analog signal can be transferred accurately between the at least one radio system and the at least one antenna system via the at least one fiber optic cable;
means for monitoring and controlling operation of at least one optical switch, such that the at least one optical switch selectively passes the low level analog signal between a desired portion of the at least one radio system and a desired antenna via the at least one fiber optic cable; and
means for filtering and conditioning at least one analog signal selected from the group comprising a high frequency signal, a very high frequency signal, a ultrahigh frequency signal, a multiband signal, and a RF signal;
wherein the means for controlling selection of the plurality of converters comprises an optical switch co-located with the at least one antenna system;
wherein the means for monitoring and controlling operation of the at least one optical switch comprises at least a network manager system associated with the at least one radio system and at least a local control system associated with the at least one antenna system;
wherein the at least one radio system is remotely located from the at least one antenna system to create a network centric architecture devoid of metallic cabling;
wherein the optical switch is configured as a photonic matrix switch;
wherein the at least one radio system comprises at least one radio selected from the group consisting of a joint tactical radio, and a digital mode radio; and
wherein the means for filtering and conditioning is configured to provide signal filtering and conditioning to achieve a desired Noise Figure (NF) and a desired Spurious Free Dynamic Range (SFDR) between the at least one radio system and the at least one antenna system such that analog signals can pass accurately between the at least one radio system and the at least one antenna system.

6. The FORFDS according to claim 5, wherein the at least one radio system is associated with a seagoing vessel.

7. The FORFDS according to claim 5, wherein the at least one radio system is associated with a fixed-site location.

8. A method of analog signal communication comprising:
providing a fiber optic RF distribution system coupling a radio system with an antenna system via at least one optical switch and a plurality of electrical-to-optical and optical-to-electrical converters, wherein the antenna system is remote from the radio system to create a network centric architecture;
transferring low level analog signals accurately between the radio system and the antenna system via the fiber optic RF distribution system;
controlling selection of the plurality of electrical-to-optical and optical-to-electrical converters, such that the low level analog signal can be transferred accurately between the radio system and the antenna system via a fiber optic cable;
monitoring and controlling operation of the at least one optical switch, such that the at least one optical switch selectively passes the low level analog signal between a desired portion of the radio system and a desired antenna via the fiber optic cable;
wherein controlling selection of the plurality of electrical-to-optical and optical-to-electrical converters comprises an optical switch co-located with the antenna system;
wherein monitoring and controlling operation of the at least one optical switch comprises a network manager system associated with the radio system and a local control system associated with the antenna system;

wherein the radio system comprises technology selected from the group consisting of joint tactical radio technology and digital mode technology;

wherein transferring low level analog signals accurately between the radio system and the antenna system via the fiber optic RF distribution system comprises conditioning and filtering the low level analog signals to achieve a desired Noise Figure (NF) and a desired Spurious Free Dynamic Range (SFDR) between the radio system and the antenna system.

9. The method according to claim 8, wherein the analog signal levels are less than 0 dBm in a range between about 2 MHz and about 2 GHz.

* * * * *